Figure 4:
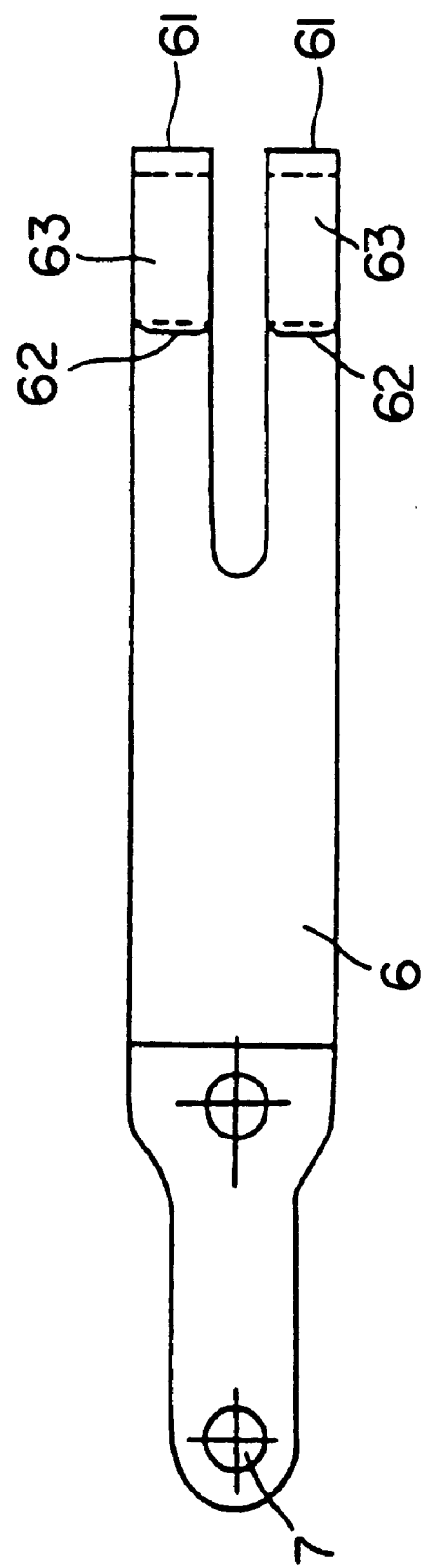

United States Patent [19]
Jaffelin

[11] Patent Number: 5,959,715
[45] Date of Patent: Sep. 28, 1999

[54] RESILIENT HINGE FOR SPECTACLES

[75] Inventor: Etienne Jaffelin, Les Rousses, France

[73] Assignee: Chevassus S.A., Morez, France

[21] Appl. No.: 08/957,932

[22] Filed: Oct. 27, 1997

Related U.S. Application Data

[63] Continuation of application No. PCT/IB96/00361, Apr. 22, 1996.

[30]    Foreign Application Priority Data

Apr. 28, 1995 [FR] France ................................ 95.05370

[51] Int. Cl.$^6$ .................. G02C 5/16; G02C 5/22
[52] U.S. Cl. .................. 351/113; 351/114; 351/153; 16/228
[58] Field of Search .................. 351/111, 113, 351/114, 119, 121, 153; 16/228

[56]    References Cited

U.S. PATENT DOCUMENTS

| 3,790,259 | 2/1974 | Leblanc | .................. 351/113 |
| 3,923,384 | 12/1975 | Leblanc | .................. 351/113 |

FOREIGN PATENT DOCUMENTS

| A2 116 242 | 7/1972 | France . |
| A2 703 477 | 10/1994 | France . |
| A38 37 180 | 5/1990 | Germany . |
| 90 05 081 U | 9/1991 | Germany . |
| 9013407 U | 1/1992 | Germany . |

*Primary Examiner*—Huy Mai
*Attorney, Agent, or Firm*—Henderson & Sturm

[57]            ABSTRACT

The present invention relates to a resilient hinge for spectacle frames. The hinge includes an inner male or female knuckle fixed to the end of a frame lug extending in a direction and an arm substantially in the extension of the lug and abutting against the lug when the arm is in its normal open position. The inner side of the arm is connected to the knuckle by means of a rigid return device which can rotate freely about the knuckle and operating by bending. The pivot point of the return device about the swivel pin of the knuckle or the swivel pin of the knuckle itself is flowing and able to move between two extreme positions respectively corresponding to the normal open position and to an additional position in which the arm is moved beyond the normal open position. The knuckle and the end of the lug are placed side by side so as to create an outer recess, so that when the arm is moved beyond its normal open position, it rests pivotingly against the end of the lug acting as a stop, thus subjecting the return device to a bending stress, which tends to bring the arm into the normal open position.

26 Claims, 5 Drawing Sheets

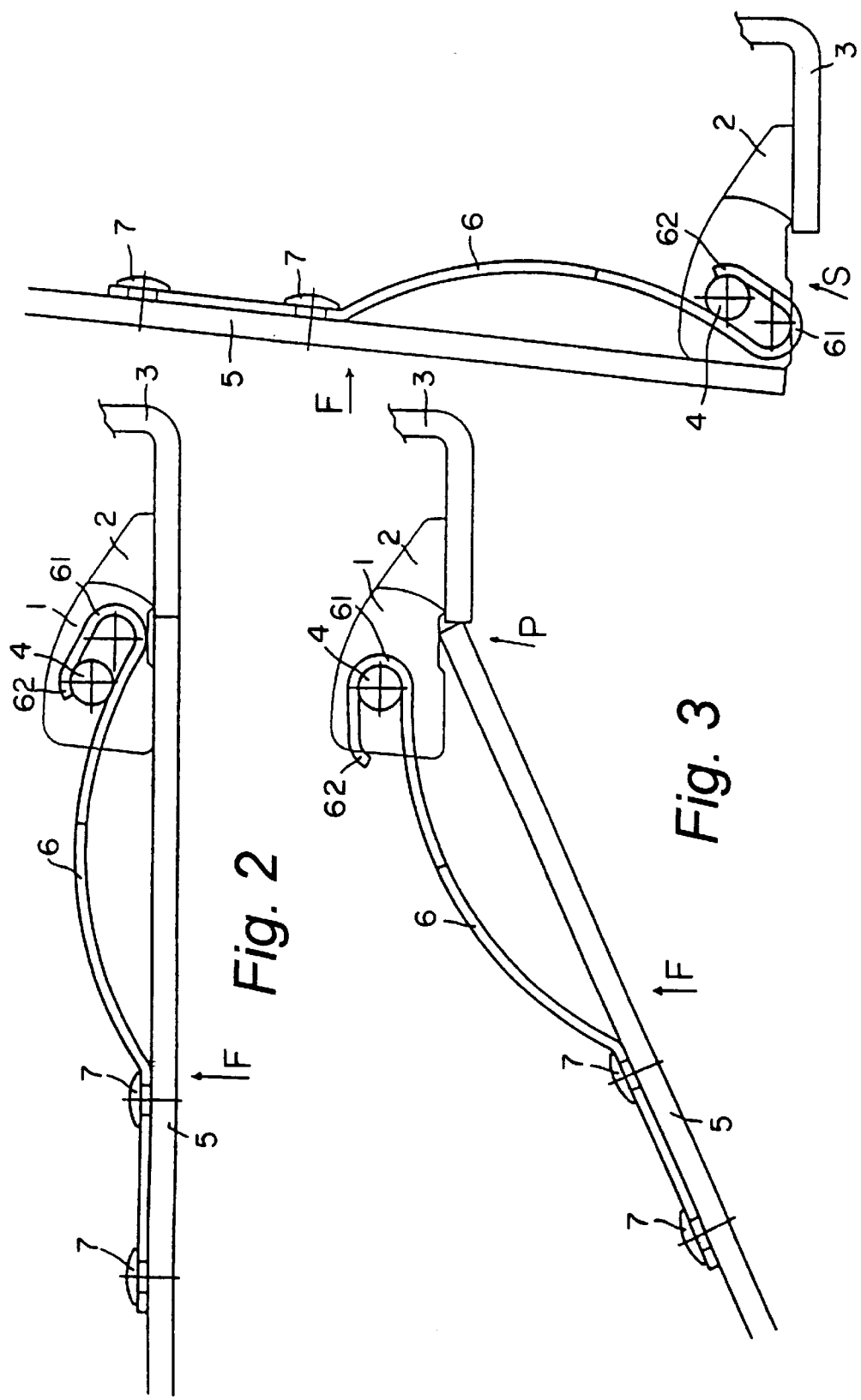

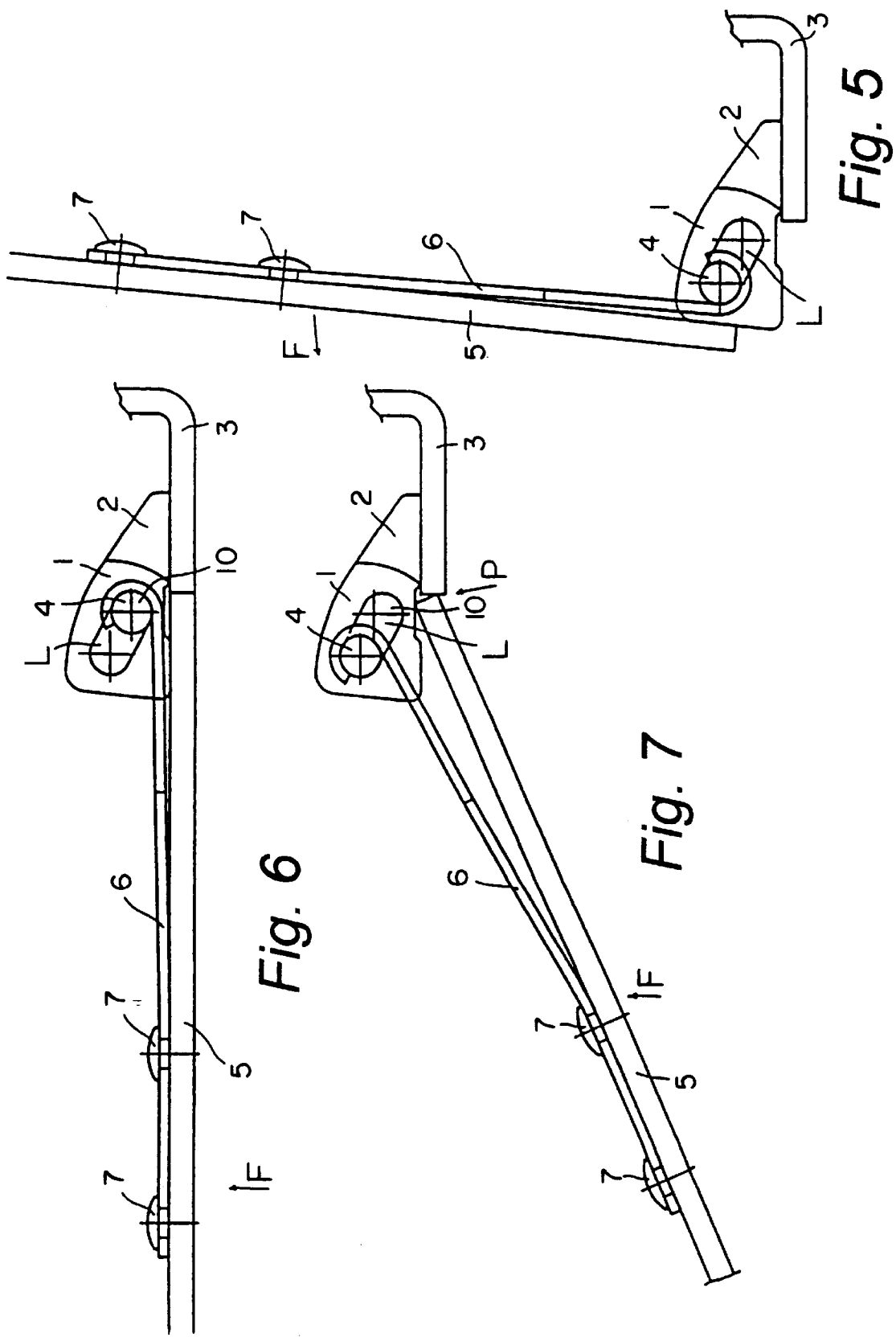

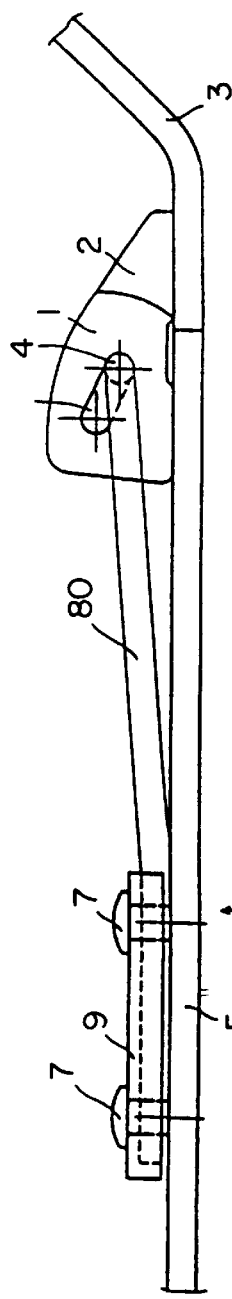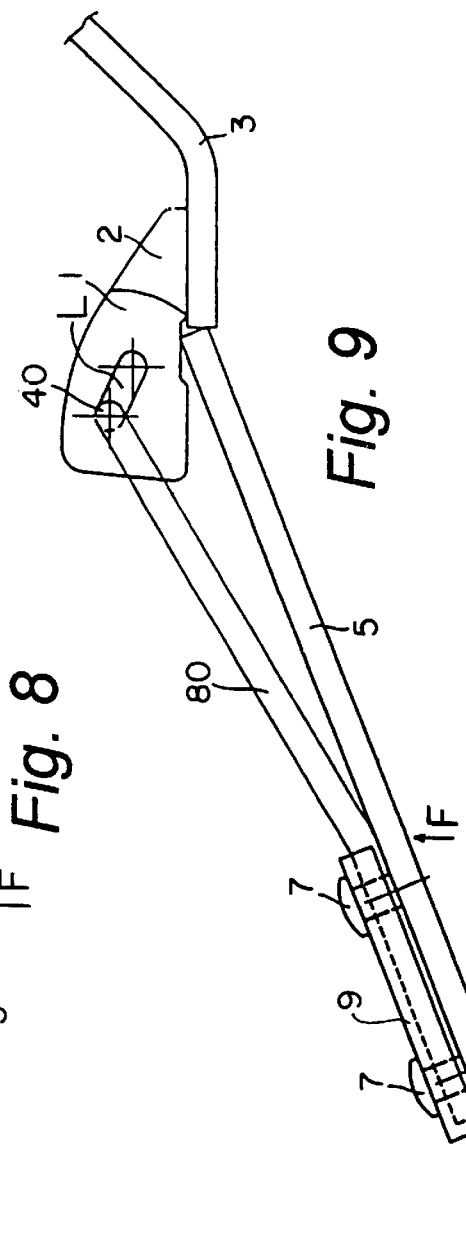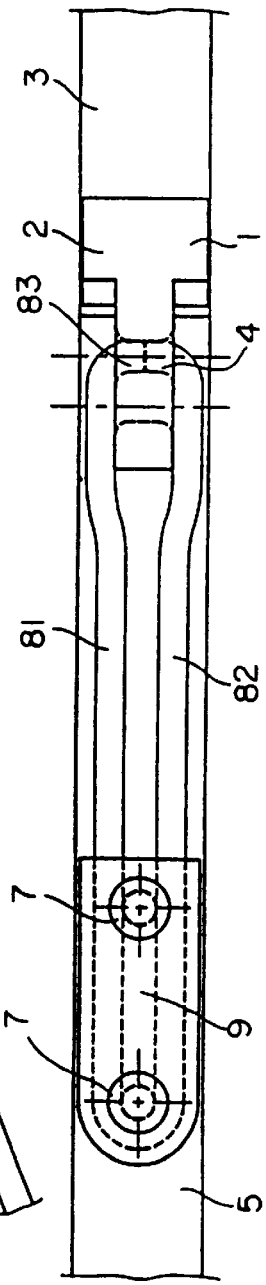

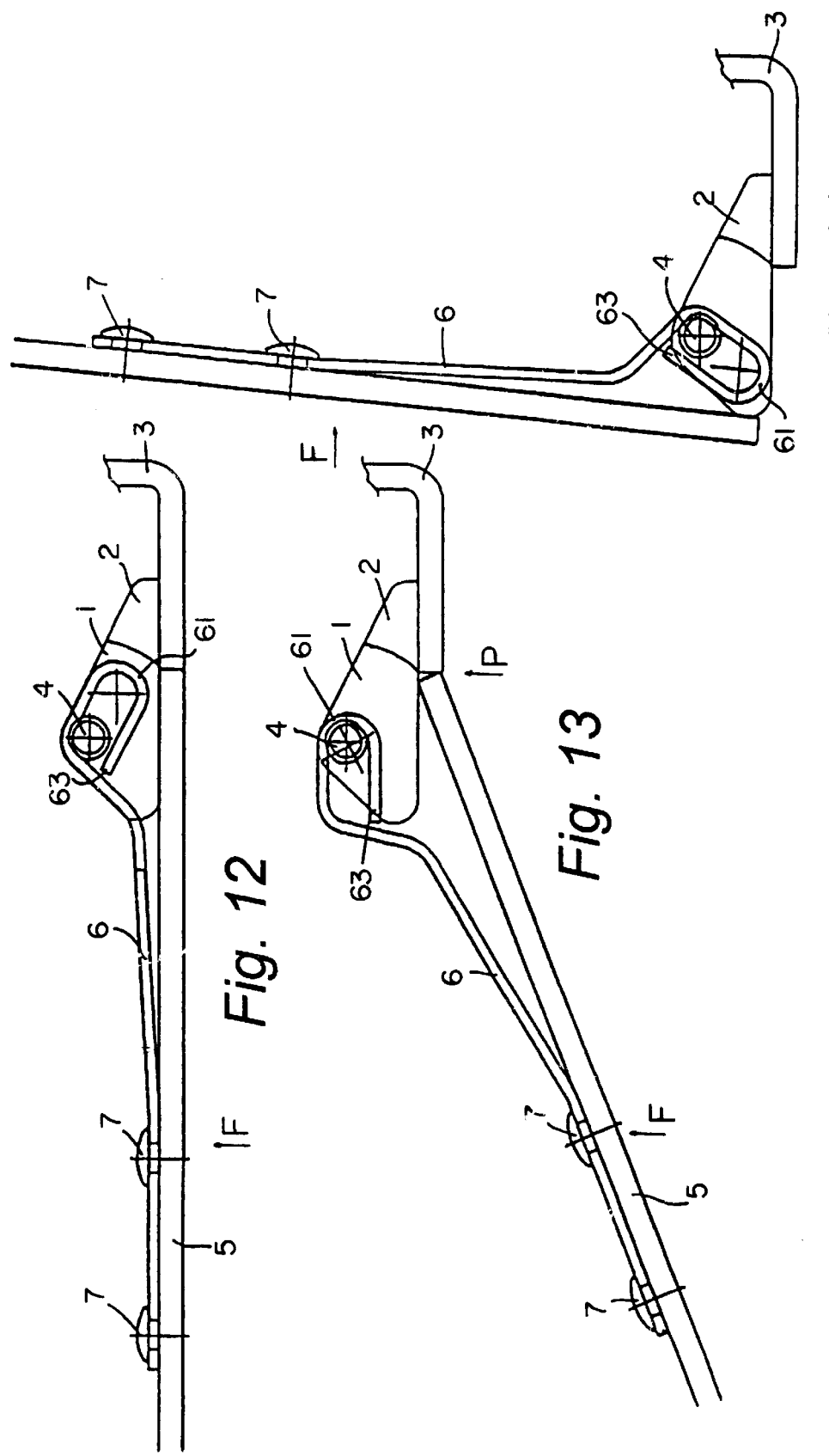

RESILIENT HINGE FOR SPECTACLES

This application is a continuation of application Ser. No. PCT/IB96/00361 filed Apr. 22, 1996.

The present invention concerns a resilient hinge for spectacle frames connecting an arm to a front part, this hinge permitting an additional resilient movement of the arm outwards beyond its "open" position, hereinafter referred to as the "normal open position". Such hinges provide an element of comfort in the wearing of spectacles which is much appreciated by users, in particular because the arms lie against the temples without excessive pressure.

A resilient hinge generally consists on the one hand of a front knuckle firmly fixed into a side lug of the front, the said lug being straight, overlapping, rolled or elbowed, and on the other hand of an arm knuckle connected by a resilient return mechanism connected to the arm or inside this, a swivel pin providing a link between the knuckles. In resilient hinges there are hence two knuckles, one male and the other female, one being fixed to the side lug and the other to the arm. These hinges are known as a ball, telescopic or blade type (slide and cover).

Examples of resilient hinges are given more particularly in EP 0 426 947, FR 2 466 790, FR 1 511 263, EP 0 262 099, EP 0 340 161, FR 2 609 816, EP 0 191 944 and EP 0 308 533. The return mechanism is generally constructed using a spring and this return mechanism operates in compression.

This type of hinge is usually satisfactory, but has the major disadvantage of consisting of numerous very small parts produced by micro-mechanics, which involves a high manufacturing cost. In addition, mounting the return device and its stop is complicated and delicate.

Resilient hinges also exist of which the return mechanism is cylindrical, such as described in EP 0 607 114, but their manufacture requires complicated machining operations, also involving high costs.

Other hinges have been described, those described for example in FR 1 009 345 (very old patent going back to 1948) and DE 4 241 660. In FR 1 009 345, the resilient hinge comprises an arm which, by the shape given to it, rests against the swivel pin of the arm towards the front, creating an elastic return force directed inwards. A hinge of this type could not withstand use for a long period, even in normal use. In DE 4 241 660, return is caused by an extension of the arm which rests on this same swivel pin and, by the lever effect, creates a force directed inwards. Naturally, the component acting as a lever is of necessity situated on the outside, which considerably spoils the aesthetics of the frame, apart from the fact that the extension projects, which may constitute a nuisance or even a danger for the user.

Finally, and this is not one of the minor disadvantages, the actual structure of the hinge and of the return mechanism, as well as constraints in assembly, do not allow a resilient hinge to be produced for which, in the open position, continuity of lug and arm is ensured without a break, protuberance or hole, which brings about the same disadvantages.

If it is desired to place the component acting as a lever on the inside, this involves considerable complications and multiplies the number of parts, as is described for example in FR 1 196 398. This time, in certain positions, the component acting as a lever projects inwards. It is poorly protected and may be accidentally deformed or pulled off.

The hinge described in FR 2 626 682 should be recalled (which is not however a resilient hinge) as well as the hinge described in WO 94/11774 which, on the contrary, may be opened widely beyond its normal open position. It belongs to hinges of the lever type referred to previously and hence has the same disadvantages.

The aim of the invention is precisely to overcome all these defects by providing a resilient hinge having the simplicity of the hinges described in the two documents referred to above while not having their disadvantages. This hinge comprises an inner male or female knuckle fixed to the end of a frame lug, and an arm substantially in the extension of the lug and abutting against this when it is in its normal open position. The inner side of the arm is connected to the knuckle by means of a rigid return device which can rotate freely about the knuckle and operates by bending. The pivot point of the return device about the swivel pin of the knuckle or the swivel pin of the knuckle itself is floating and able to move between two extreme positions. The knuckle and the end of the lug are placed side-by-side so as to create an outer recess, so that when the arm is moved beyond its normal open position, it rests pivotingly against the end of the lug acting as a stop, thus subjecting the return device to a bending stress, which tends to bring the arm into the normal open position.

The definition, "rigid return device" is intended to indicate that the device has the mechanical strength necessary to hold the arm in place even during its opening and closing movements, which is hence substantially dimensionally stable in compression or extension, except when flexed since this is the manner in which it operates.

In a first embodiment, it is the pivot point of the return device about the knuckle which is floating and forms a ramp, and the two extreme positions are determined by the looped shape given to the end of the return device around the swivel pin of the knuckle. The end of the return device advantageously has the form of a closed or open loop wound around the swivel pin of the knuckle, the width of the opening being less than the diameter of the swivel pin of the knuckle.

In a second embodiment, it is the swivel pin of the knuckle which is floating and the two extreme positions are defined by a slot provided in the knuckle. The slot is then advantageously inclined with respect to the axis of the lug at an angle of between 0° and 60°, preferably 45°.

Preferably, the knuckle of the resilient hinge has a shape which forms a cam on which the arm rests when opened and closed, which defines, together with the return device, two stable rest positions, the normal open position and the closed position respectively, where the arm is folded back against the front part of the frame.

The return device may be made of any material whatsoever having the necessary mechanical strength, for example metal, steel, aluminium, titanium, etc.

The return device may consist of a blade. It may also consist of a rod, or better of a double open or closed rod having for example, seen from above, a tuning fork shape, the arms of which may be parallel or not, in the same plane or in different planes.

The return device may have, seen from the side, a straight, arc-shaped, bowed or arched form, with a curved profile, for example circular or elliptical, and it may also have an elbowed form, for example with several elbows, i.e. with a polygonal profile.

It will obviously be understood that, contrary to traditional resilient hinges, the arm of the hinge according to the invention is not fixed directly to the knuckle.

The invention will be better understood with reference to the accompanying drawings, given by way of non-limiting examples. It should be clearly understood that the various variants illustrated in the figures may be combined with each other. In these drawings, where identical reference numbers indicate identical or similar parts:

FIGS. 1, 2 and 3 are side views of a resilient hinge according to the invention, in a first embodiment, illustrating respectively the position where the arm is closed, opened normally and opened beyond its normal position, FIG. 4 is a detailed view from above of the return device of the hinge of FIGS. 1 to 3, FIGS. 5, 6 and 7 are side views of a resilient hinge according to the invention, in another embodiment, illustrating respectively the position where the arm is closed, opened normally and opened beyond its normal position, FIGS. 8 and 9 are side views of a similar hinge to that of FIGS. 5 to 7, illustrating respectively the position where the arm is opened normally and opened beyond its normal position, FIG. 10 is a view from above of the arm and its return device of the hinge illustrated in FIGS. 8 and 9, and FIGS. 11 to 13 correspond to a variant of the hinge of FIGS. 1 to 3.

As will be seen in FIGS. 1, 2 and 3, and 11, 12 and 13 respectively, which are three side views of two first variants of the hinge according to the invention and which illustrate the operating principle, a frame knuckle 1 is fixed by means of a connecting part 2 acting as an embellishment on an elbowed front lug 3, this front, not shown, being in a plane perpendicular to the lug 3. The knuckle 1 has a swivel pin 4. The arm 5, otherwise free in relation to the lug 3, is firmly fixed to the knuckle 1 via a return device 6 which rests on the swivel pin 4 and is attached to the arm by two screws 7. The return device 6 can turn freely about the swivel pin 4. Unlike hinges described in the documents referred to above, and this is fundamental, the return device 6 also acts as a device for holding the arm 5 and connecting this with the knuckle 1.

In the closed position, the return device 6, which has an arched shape, is sufficiently rigid to ensure that the lug 3 and the arm 5 are adequately held together. The return device 6 curves around the swivel pin 4 in a loop 61 which is slightly closed at the end 62 (FIGS. 1, 2 and 3). It will be noted that in this position the device 6 rests on the swivel pin 4 at its end 62. The opening at the end 62 is of course smaller than the diameter of the swivel pin 4.

In the embodiment of FIGS. 11, 12 and 13, the device 6, which is substantially straight, ends in a loop 61, which by turning in the other direction completely surrounds the end 63. In this way, any "hook" is avoided which could prove to be aggressive.

When the hinge is opened, passing from the position illustrated in FIG. 1 to the position illustrated in FIG. 2, the arm 5 pivots about the swivel pin 4 while sliding over the supporting surface S of the knuckle, which here has the form of a rounded square, so as to force the arm 5, either into the closed position of FIG. 1, or into the normal open position of FIG. 2. It will of course be understood that, in an intermediate position, since the supporting surface S is not round, the arm 5 moves away from the swivel pin 4, which imparts a bending stress to the return device 6 at the point F, i.e. at the point of connection between the device 6 and the arm 5, at one of the screws 7, where the device 6, from being arched, now becomes straight. At the point F where it has bowed, the return device 6 acts like the leaf of a spring.

This bending stress tends to return the arm 5 into its initial closed position if the opening is less than 45°, or to move it to its normal open position, as shown in FIG. 2, if it is opened beyond 45°. Since a knuckle has the form of a cam it creates a bistable effect.

It should however be clearly understood here that the knuckle 4 may have a perfectly circular supporting surface S, in which case the arm 5 does not have a preferred open or closed position and hence can remain stable at any opening angle whatsoever.

It will be noted that, in the normal open position illustrated in FIG. 2, the return device has taken up a position which is substantially identical to that of the closed position of FIG. 1 and that, especially, it always rests on the swivel pin 4 at its end 62, 63 respectively.

When the normal open position represented in FIG. 2 is exceeded, in order to be in the additionally open position represented in FIG. 3, the arm 5, which in the open position is abutted against the knuckle 3, rests against the latter so as to pivot about a point P, which moves the return device 6 away in relation to the arm 5 and hence it once again imparts a bending stress at the point F, creating a large return force which tends to return the arm 5 from the position of FIG. 3 into its normal open position of FIG. 2.

The shape of the return device 6, here bow-shaped, as well as its length and its thickness, may be chosen to create a return force which is sufficient but not too great, so that a very small stress is sufficient for it to pass against the supporting surface S of the knuckle 1 from the position of FIG. 1 (closed) to the position of FIG. 2 (open).

However, on the other hand, a large deformation in the region of the point F may generate, if desired, a large return force so that, if the need arises, the additional opening of FIG. 3 calls for a more vigorous action.

The characteristics of the return device 6, chosen to define a relationship between the forces to be exerted as indicated above, may also be chosen to obtain a relationship between the forces which is equal to, or the inverse of, that which is described above.

As will be seen in FIG. 3, not only the return device 6 has bowed in the region of the point F, but it has slid against the swivel pin 4, until this swivel pin 4 has come to a stop inside the loop 61 constituting the end of the device 6.

It is therefore a combination of a sliding action where the swivel pin is floating and of a bending action at the point F which allows opening to take place beyond the normal elastic return position.

It is important to note here that the device 6 has a double function, that of acting as a return device when the arm is opened normally (FIG. 1 to FIG. 2) and that of acting as a return device when opening takes place beyond normal opening (FIG. 2 to FIG. 3), this being by means of the same bending mechanism.

The operation of the hinge of FIGS. 11 to 13 is similar to the operation of the hinge of FIGS. 1 to 3.

The return device 6 is shown from above in FIG. 4, ending in two forks 63 each consisting of a loop 61 and a slightly closed end 62. In this way, these ends can clip around the swivel pin 4, for example over two studs extending this swivel pin, and the two closed ends 62 prevent the swivel pin 4 from leaving the return device 6. The studs may be replaced by a clip-on pin.

Alternatively, the elbowed or curved blade may end in a central fork clipping onto the swivel pin, the two studs which extend it acting as an anchor for the female knuckle. In one case the knuckle is male and in the other case female.

For essentially technical reasons connected with the clipping ability as distinct from the return function, the two clipping forks 63 of the device 6 may be straight (variant shown) or more or less narrowed in the direction of the studs, over all or part of their rolled length.

As regards the swivel pin 4, this may be integral with the knuckle or attached, for example in the form of a lock pin, rivet pin or screw.

As a variant, not shown, the blade, instead of being an arc-shaped blade, may be a blade which is elbowed in several places.

The return device may also be made in the form of one or more rods as will be seen in the following figures, but it should be clearly understood that a return device in the form of a rod may also be used in the embodiment shown in FIGS. 1 to 3, and 11 to 13 respectively.

In FIGS. 5 to 10, which correspond to another embodiment with a rod, it will be noted that the return device 6, which is here substantially straight, is normally fixed to the swivel pin 4 and that this swivel pin is able to move in a slot 10 provided inside the knuckle 1, at an angle substantially directed at 30° with respect to the arm 5 in its open position.

Since the devices having the same reference numbers are identical or similar and have in each case an identical function, it will be sufficient to describe how it is possible to pass from FIGS. 5 to 7, i.e. how it is possible to pass from the closed arm position to the normally open position, and then to the additionally open position.

Between the closed position shown in FIG. 5 and the open position shown in FIG. 6, nothing occurs other than that which has been described in FIGS. 1 and 2, with the cam effect due to the angular form of the knuckle 1, the return device 6 tending to close or open the arm 5 by bending at P.

When the arm is pulled beyond its normal position so as to be situated as in FIG. 7, the swivel pin 4 slides in the slot 10 acting as a ramp from right to left, under a pivoting effect about the point P, which once again exerts a bending force on the return device 6 at the point F.

When the arm is released, the return force thus created returns the arm 5 into the extension of the lug 3 and the swivel pin 4 slides towards the right to return to its initial position.

FIGS. 8 to 10 correspond to the same embodiment as that of FIGS. 5 to 7, with the swivel pin 4 floating in a ramp, but the return device, indicated here by 80, is in the form of a double rod consisting in reality of a single rod folded into two sections 81, 82, the end 83 of which is closed and forms the hinge swivel pin 4 for the knuckle.

At the other end, the two sections are fixed to the arm 5 by two screws 7 by means of a connector 9 which imprisons it. Advantageously, the double rod has a tuning fork shape.

It will be noted that the intermediate device 9 may enable the anchorage point of the device 81 on the arm 5 to be very slightly offset, which will have an effect on the bending force at the point F, and hence on the return force.

Such an embodiment with a double rod lends itself extremely well to the production of a hinge which can be dislocated, namely a hinge of which the arm 5 is not necessarily exactly in the extension of the lug 3 and may be separated from it by being inclined at an angle α or an angle β in one plane or another. For more details, reference should be made to the French patent application by the Applicant, n° 94.14743 not yet published, the contents of which are incorporated here by way of reference.

The resilient hinge according to the invention, apart from its great simplicity and hence its great reliability, has the advantage that in the normal open position, there is perfect continuity between the arm (5) and the lug (3).

I claim:

1. A resilient hinge for spectacle frames, comprising; an inner male or female knuckle fixed to the end of a frame lug which extends in a direction, and an arm substantially in the extension of the lug and abutting against the lug when the arm is in its normal open position, wherein the inner side of the arm is connected to the knuckle by means of a rigid return device which can rotate freely about the knuckle and operating by bending, and wherein a pivot point of the return device about the swivel pin of the knuckle or the swivel pin of the knuckle itself is flowing and able to move between two extreme positions, respectively corresponding to the normal open position and to an additional position in which the arm is moved beyond the normal open position, the knuckle and the end of the lug being placed side by side so as to create an outer recess, so that when the arm is moved beyond its normal open position, it rests pivotingly against the end of the lug acting as a stop, thus subjecting the return device to a bending stress, which tends to bring the arm into the normal open position.

2. A resilient hinge according to claim 1, wherein the return device forms a ramp and is floating about the knuckle by a pivot point, and the two extreme positions are determined by the looped shape given to the end of the return device around the swivel pin of the knuckle.

3. A resilient hinge according to claim 2, wherein the end of the return device has the form of an open loop wound around the swivel pin of the knuckle, the width of the opening of the loop being less than the diameter of the swivel pin of the knuckle.

4. A resilient hinge according to claim 3, wherein the knuckle has a form making a cam on which the arm rests when opened and closed, which defines, together with the return device, two stable rest positions, the normal open position and the closed position, respectively, where the arm is folded back against the front part of the frame.

5. A resilient hinge according to claim 3 wherein the return device is selected from the group consisting of a straight blade and an arc-shaped blade.

6. A resilient hinge according to claim 3, wherein in the normal open position, there is substantially perfect continuity between the arm and the lug.

7. A resilient hinge according to claim 2, wherein the end of the return device has the form of a closed loop wound around the swivel pin of the knuckle.

8. A resilient hinge according to claim 7, wherein the knuckle has a form making a cam on which the arm rests when opened and closed, which defines, together with the return device, two stable rest positions, the normal open position and the closed position, respectively, where the arm is folded back against the front part of the frame.

9. A resilient hinge according to claim 7 wherein the return device is selected from the group consisting of a straight blade and an arc-shaped blade.

10. A resilient hinge according to claim 7, wherein in the normal open position, there is substantially perfect continuity between the arm and the lug.

11. A resilient hinge according to claim 2, wherein the knuckle has a form making a cam on which the arm rests when opened and closed, which defines, together with the return device, two stable rest positions, the normal open position and the closed position, respectively, where the arm is folded back against the front part of the frame in a closed position.

12. A resilient hinge according to claim 2 wherein the return device is selected from the group consisting of a straight blade and an arc-shaped blade.

13. A resilient hinge according to claim 2, wherein in the normal open position, there is substantially perfect continuity between the arm and the lug.

14. A resilient hinge according to claim 1, wherein the swivel pin of the knuckle which is floating and the two extreme positions are defined by a slot making a ramp, provided in the knuckle.

15. A resilient hinge according to claim 14, wherein the slot is inclined in relation to the axis of the lug at an angle of between about 0° and 60°.

16. A resilient hinge according to claim 14 wherein the return device comprises a rod folded into two sections, the elbowed ends of which are closed and are formed as a swivel pin of the hinge for the knuckle.

17. A resilient hinge according to claim 16, wherein in the normal open position, there is substantially perfect continuity between the arm and the lug.

18. A resilient hinge according to claim 14, wherein the knuckle has a form making a cam on which the arm rests when opened and closed, which defines, together with the return device, two stable rest positions, the normal open position and the closed position, respectively, where the arm is folded back against the front part of the frame.

19. A resilient hinge according to claim 14 wherein the return device is selected from the group consisting of a straight blade and an arc-shaped blade.

20. A resilient hinge according to claim 14 wherein the return device comprises a rod folded into two sections, the elbowed ends of which are closed and are formed as a swivel pin of the hinge for the knuckle.

21. A resilient hinge according to claim 14, wherein in the normal open position, there is substantially perfect continuity between the arm and the lug.

22. A resilient hinge according to claim 1, wherein the knuckle has a form making a cam on which the arm rests when opened and closed, which defines, together with the return device, two stable rest positions, the normal open position and the closed position, respectively, where the arm is folded back against the front part of the frame in a closed position.

23. A resilient hinge according to claim 22 wherein the return device is selected from the group consisting of a straight blade and an arc-shaped blade.

24. A resilient hinge according to claim 22, wherein in the normal open position, there is substantially perfect continuity between the arm and the lug.

25. A resilient hinge according to claim 1 wherein the return device is selected from the group consisting of a straight blade and an arc-shaped blade.

26. A resilient hinge according to claim 1, wherein in the normal open position, there is substantially perfect continuity between the arm and the lug.

* * * * *